United States Patent
Cho (10) Patent No.: US 8,160,058 B2
(45) Date of Patent: Apr. 17, 2012

(54) METHOD AND APPARATUS FOR SIGNALING VOIP CALL BASED ON CLASS OF SERVICE IN VOIP SERVICE SYSTEM

(75) Inventor: Won-Sang Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1201 days.

(21) Appl. No.: 11/268,606

(22) Filed: Nov. 8, 2005

(65) Prior Publication Data

US 2006/0104264 A1 May 18, 2006

(30) Foreign Application Priority Data

Nov. 17, 2004 (KR) .................. 10-2004-0094370

(51) Int. Cl.
*H04L 12/66* (2006.01)
(52) U.S. Cl. ............... 370/352; 370/356; 370/395.21; 370/229; 370/230; 370/389; 370/218; 370/252
(58) Field of Classification Search ............ 370/351, 370/352–356, 252, 395.21, 229, 218, 233
See application file for complete search history.

(56) References Cited

U.S. PATENT DOCUMENTS

| | | | | |
|---|---|---|---|---|
| 6,343,073 B1* | 1/2002 | Mashinsky | .............. | 370/352 |
| 7,002,919 B1* | 2/2006 | El-Sayed | .............. | 370/252 |
| 7,583,659 B2* | 9/2009 | Matsuhashi et al. | .............. | 370/352 |
| 2002/0176404 A1* | 11/2002 | Girard | .............. | 370/352 |
| 2004/0114515 A1* | 6/2004 | Kim | .............. | 370/230 |
| 2006/0133360 A1* | 6/2006 | Veschi | .............. | 370/352 |
| 2007/0097862 A1* | 5/2007 | Moon et al. | .............. | 370/230 |
| 2007/0110043 A1* | 5/2007 | Girard | .............. | 370/352 |

FOREIGN PATENT DOCUMENTS

| | | |
|---|---|---|
| GB | 2397967 | 8/2004 |
| GB | 2410857 | 8/2005 |
| WO | WO 01/37532 | 5/2001 |

\* cited by examiner

*Primary Examiner* — Joe Cheng
*Assistant Examiner* — Khaled Kassim
(74) *Attorney, Agent, or Firm* — H.C. Park & Associates, PLC (57) ABSTRACT

In a method and apparatus for signaling a voice over Internet protocol (VoIP) call based on a class of service in a VoIP service system, a database which includes VoIP signaling information differentiated by the class of VoIP service is built, and the database is retrieved by a service class assignment condition to produce a call setup message. The call setup message includes information related to the service class. Accordingly, it is possible to perform dynamic VoIP signaling by setting a differentiated service class based on each user or a primary factor of each class of the VoIP service.

13 Claims, 4 Drawing Sheets

FIG. 2

| Level | Sig. Profile | CALLER ID | | CALLED ID | | POSITION | CHARGE CLASS | NOTE |
|---|---|---|---|---|---|---|---|---|
| | | ID | DIGIT | ID | DIGIT | | | |
| 1 | Sig_1 | 01695304* | 11 | - | - | - | - | CALLER ID |
| | | - | - | 0169530* | 13~14 | - | - | CALLER ID |
| | | - | - | 001* | 11 | - | - | INTERNATIONAL TELEPHONY |
| | | - | - | - | - | DIRECTOR | - | POSITION |
| | | 01695304404 | - | - | - | - | High | CHARGE |
| 1 | Sig_1 | ... | ... | ... | ... | ... | ... | ... |
| 2 | Sig_2 | 031* | 10~11 | - | - | - | - | CALLER ID |
| | | - | - | 03* | 10~11 | - | - | CALLER ID |
| | | - | - | 04* | 10~11 | - | - | CALLER ID |
| | | - | - | - | - | GENERAL MANAGER | - | POSITION |
| | | 0312794404 | - | - | - | - | Medium | CHARGE |
| 2 | Sig_2 | ... | ... | ... | ... | ... | ... | ... |
| 3 | Sig_3 | - | - | - | - | - | Low | CHARGE |

FIG. 3

| Level | G.711 | | G.723.15.3K | | G.723.16.3K | | G729A | |
|---|---|---|---|---|---|---|---|---|
| | Silence Enable | Silence Disable | Silence Enable | Silence Disable | Silence Enable | Silence Disable | Silence Enable | Silence Disable |
| 1 | 60.5K | 150.4K | 7.9K | 19.7K | 8.3K | 20.8K | 20.5K | 51.2K |
| 2 | 42.9K | 107.2K | 5.0K | 12.5K | 5.4K | 13.6K | 11.8K | 29.6K |
| 3 | 37.1K | 92.8K | 4.0K | 10.1K | 4.9K | 11.2K | 9.0K | 22.4K |
| 4 | 34.2K | 85.6K | 3.6K | 8.9K | 4.4K | 10.9K | 7.5K | 18.8K |
| 5 | 32.5K | 81.3K | 3.3K | 8.2K | 3.7K | 9.3K | 6.6K | 16.6K |
| 6 | 31.4K | 78.4K | 3.1K | 7.7K | 3.5K | 8.8K | 6.1K | 15.2K |
| 7 | 30.5K | 76.3K | | | | | 5.6K | 14.1K |
| 8 | 30.0K | 74.8K | | | | | 5.4K | 13.4K |
| 9 | 29.4K | 73.6K | | | | | 5.1K | 12.8K |
| 10 | 29.0K | 72.6K | | | | | 4.9K | 12.3K |

FIG. 4A

| SIG_1 | Setup | CODEC | G.711 |
|---|---|---|---|
| | | Silence Suppression | Disable |
| | | MultiFrame Count | 1 |
| | Connect | CODEC PRIORITY | G.711>G.729>G.723 |
| | | Silence Suppression | Disable |

FIG. 4B

| SIG_2 | Setup | CODEC | G.711 |
|---|---|---|---|
| | | Silence Suppression | Enable |
| | | MultiFrame Count | 3 |
| | Connect | CODEC PRIORITY | G.711>G.729>G.723 |
| | | Silence Suppression | Enable |

FIG. 4C

| SIG_3 | Setup | CODEC | G.729 |
|---|---|---|---|
| | | Silence Suppression | Enable |
| | | MultiFrame Count | 3 |
| | Connect | CODEC PRIORITY | G.729>G.723>G.711 |
| | | Silence Suppression | Enable |

METHOD AND APPARATUS FOR SIGNALING VOIP CALL BASED ON CLASS OF SERVICE IN VOIP SERVICE SYSTEM

CLAIM OF PRIORITY

This application makes reference to, incorporates the same herein, and claims all benefits accruing under 35 U.S.C. §119 from an application for METHOD FOR SIGNALING VoIP CALL BASED ON CLASS OF SERVICE OF VoIP SERVICE SYSTEM AND APPARATUS THEREOF earlier filed in the Korean Intellectual Property Office on Nov. 17, 2004 and there duly assigned Serial No. 10-2004-0094370.

BACKGROUND OF THE INVENTION

1. Technical Field

The present invention relates to a voice over Internet protocol (VoIP) service and, more particularly, to a method and apparatus for signaling a VoIP call based on a class of service in a VoIP service system, the method and apparatus being capable of dynamically performing VoIP signaling based on the service class to set up a call by discriminating and setting various quality of service (QoS) factors based on the service class depending on a user policy or a VoIP operator's policy in the VoIP service system.

2. Related Art

Recently, a voice over Internet protocol (VoIP) technique that transfers voice over a packet network is attracting much attention. VoIP-based Internet phone service has been put to practical use since 1995 and, in Korea, various services have been provided by lawful Internet phone providers since January, 1998 under the revised telecommunication business law, allowing significantly inexpensive international calls compared to existing telephone charges. In addition, a free service which was begun in autumn 1999 provided a chance to attract the attention of the public with respect to Internet phone service. Existing telephone network providers are now experiencing a crisis, and the telephony service market has been said to be in need of reform.

At present, a representative example of the VoIP technique includes the IP telephony service which is mainly provided over an Intranet network using an IP-PBX.

Free VoIP-based Internet telephony service, which has recently achieved much popularity due to its openness, spreads recognition on the Internet phone to public users, and causes significant change in the national economic planning led by large-scaled enterprise groups. Furthermore, with Is the evolution of Internet network capability and associated techniques, it is predicted that, in the ultimate, all communication systems and the Internet will be incorporated, or Internet based communications will be substituted for existing communications.

The voice over Internet protocol (VOIP) is a technology that transfers voice information having continuity and real-time features over an Internet characterized by a packet switched network. The voice over Internet protocol is applicable to various application fields but is being currently used with substantially the same meaning as the Internet telephony. Friendliness of the Internet telephony to the public is because of its lower communication cost. Even though free PC-to-telephony service has not begun, an inexpensive PC-to-PC Internet phone, inexpensive international telephony by a voice resale provider, and the like have already attracted attention. Initially, existing telephony providers, who feel concern about rapid market encroachment, have even raised a lawful issue.

The VoIP-based Internet phone service has competitive pricing for two reasons: first, the Internet phone utilizes an Internet backbone network which is already disposed and utilized as a data transmission network; and second, the Internet phone uses a packet transmission system, and thus it is able to use the network more efficiently as compared to the existing telephone network, which exclusively occupies a line in a busy state, thus reducing a communication cost.

However, this may be a cause of degrading capability of the Internet phone, and thus various techniques for overcoming this problem are required. An alternative has been suggested, and it calls for real-time data (e.g., voice and image) and a data transmission network which should be separated virtually or substantially.

In addition to competitive pricing, the VoIP-based Internet phone has the advantages of flexible utilization of bandwidth, ease of differentiated services, incorporation with various services, and the like. The VoIP Internet phone has further advantages in that the VoIP phone service costs the same irrespective of calling distance, and the VoIP phone is easy to access because the VoIP phone is available wherever the Internet is disposed.

On the other hand, the Internet phone has many technical problems to be solved. Retardation and unsatisfactory communication quality caused by the capability of networks and terminals, interoperability between various device manufacturers that use their own way, security, the provision and operation of various services available for existing telephones, the creation of new services to effectively combine other functionalities of the Internet, and the like are imminent problems.

The evolution and generalization of the VoIP may be a way in which these problems get successfully solved. Some outcomes obtained by various efforts in the art have yielded the current services.

The VoIP, which is a service for conveying image, voice and facsimile messages over the Internet, transmits real-time media such as voice and video, for example, where a user desiring to use the Internet accesses the Internet by means of his or her PC, by means of an independent device operating with an Internet protocol, or by calling to a gateway at an existing public switched telephone network (PSTN) terminal.

With the VoIP service, there is a need to discover and signal a correspondent. Examples of the VoIP signaling include H.323 of the International Telecommunication Standardization Sector (ITU-T), and session initiation protocol (SIP) of the Internet Engineering Task Force (IETF).

In a conventional VoIP service system, key factors for the VoIP service, such as the type of VoIP signaling (e.g., H.323, SIP, MGCP, MEGACO, and H.248), the type of used codec, silence suppression or non-silence suppression, and a count of multiframes, have been set as fixed values for the sake of the VoIP signaling.

Thus, the conventional VoIP service system does not employ a class of service (CoS) concept in which services are classified and provided by the service class, but rather employs a CoS in which the same quality of service (QoS) is applied to all users.

For this reason, an ISP or private network which provides the VoIP service uses a codec having a short sampling period so as to guarantee some VoIP QoS when performing the VoIP service. The reason of using a codec having a short sampling period relates to network bandwidth.

That is, since the G.711 codec uses a bandwidth exceeding the bandwidth per call (64 kbps) used in a public switched telephone network (PSTN), it is difficult to expect efficient bandwidth use in the performance of voice data compression for VoIP service. This is a cost burden for the VoIP provider who leases and uses a line.

Thus, the prior art has difficulty in providing the VoIP CoS because the VoIP terminal or VoIP server for the VoIP service applies the same VoIP QoS factor to all calls. That is, the same signaling capability negotiation is applied when handling all VoIP calls.

Accordingly, a codec having good mean opinion score (MoS) and perceptual evaluation of speech quality (PESQ) is used to guarantee QoS to all users, which causes a problem of overuse of the frequency band.

Meanwhile, there is no great difference in conscious voice sensitivity between codecs when a stabilized network, like a dedicated line, is used. However, when streaming data is VoIP-processed (e.g., color ring for a cell phone) like music data, there may be a difference in the conscious sensitivity between the codecs.

Furthermore, in a VoIP network where common data and voice are used together, there may be a significant difference in voice quality depending on VoIP media factors (e.g., codec, silence suppression, and multiframe count).

For this reason, the VoIP service provider uses a G.711 codec, which is used in the PSTN having a short sampling period, and which causes the overuse of the frequency band and thus waste of a resource.

SUMMARY OF THE INVENTION

The present invention has been made to solve the aforementioned problems. It is an object of the present invention to provide a method and apparatus for signaling a VoIP call based on a class of service in a VoIP service system, the method and apparatus being capable of dynamically performing VoIP signaling based on the service class to set up a call by discriminating and setting various quality of service (QoS) factors based on the service class depending on a user's or a VoIP operator's policy in the VoIP service system.

According to an aspect of the present invention, there is provided a method for signaling a voice over Internet protocol (VoIP) call based on a class of VoIP service in a VoIP service system, the method comprising: building a database which includes VoIP signaling information differentiated by the class of VoIP service; and retrieving the database based on a service class assignment condition so as to produce a call setup message, the call setup message including information as to the service class.

According to another aspect of the present invention, there is provided a method for signaling a voice over Internet protocol (VOIP) call based on a class of VoIP service in a VoIP service system, the method comprising: building a database which includes VoIP signaling information differentiated by the VoIP service class; and performing the signaling by extracting information as to the service class from a call setup message upon receipt of the call setup message, and by producing a response message in a signaling format corresponding to the extracted service class, the signaling format being set in the database.

According to yet another aspect of the present invention, there is provided an apparatus for signaling a voice over Internet protocol (VoIP) call based on a class of service in a VoIP service system, the apparatus comprising: a memory having a program stored therein; and a processor connected to the memory for executing the program; wherein the processor comprises a VoIP server for building, by means of the program, a database which includes VoIP signaling information differentiated by a class of VoIP service, and for retrieving the database based on a service class assignment condition so as to produce a call setup message containing information as to the service class.

According to yet another aspect of the present invention, there is provided an apparatus for signaling a voice over Internet protocol (VOIP) call based on a class of service in a VoIP service system, the apparatus comprising: a memory having a program stored therein; and a processor connected to the memory for executing the program; wherein the processor comprises a VoIP server for performing the signaling by building, by means of the program, a database which includes VoIP signaling information differentiated by a class of VoIP service, and by extracting information on the service class from a call setup message upon receipt of the call setup message so as to produce a response message in a signaling format corresponding to the extracted service class, the signaling format being set in the database.

Thus, the present invention defines call setup signaling for VoIP signaling based on each class of VoIP service, and differently applies the signaling. In order to realize this functionality, the invention incorporates media information dependent on a relevant a VoIP service class into a media capability setup field of the VoIP call setup message, thus providing service for a desired service class.

Accordingly, it is possible to apply VoIP CoS through dynamic VoIP signaling, and to enhance efficiency of use of the bandwidth by defining a setup message for each service class, and applying the call setup of the VoIP service to each call.

A called party is able to define a VoIP response policy in the CoS class so as to provide a method for processing a VoIP CoS.

The VoIP CoS signaling is applicable to both the VoIP server (e.g., a SIP server and H.323 GK) and the VoIP terminal. In particular, a terminal user is allowed to earmark and operate his or her VoIP CoS policy.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

The present invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and fully convey the scope of the invention to those skilled in the art. Like numbers refers to like elements throughout the specification.

Figure 1:
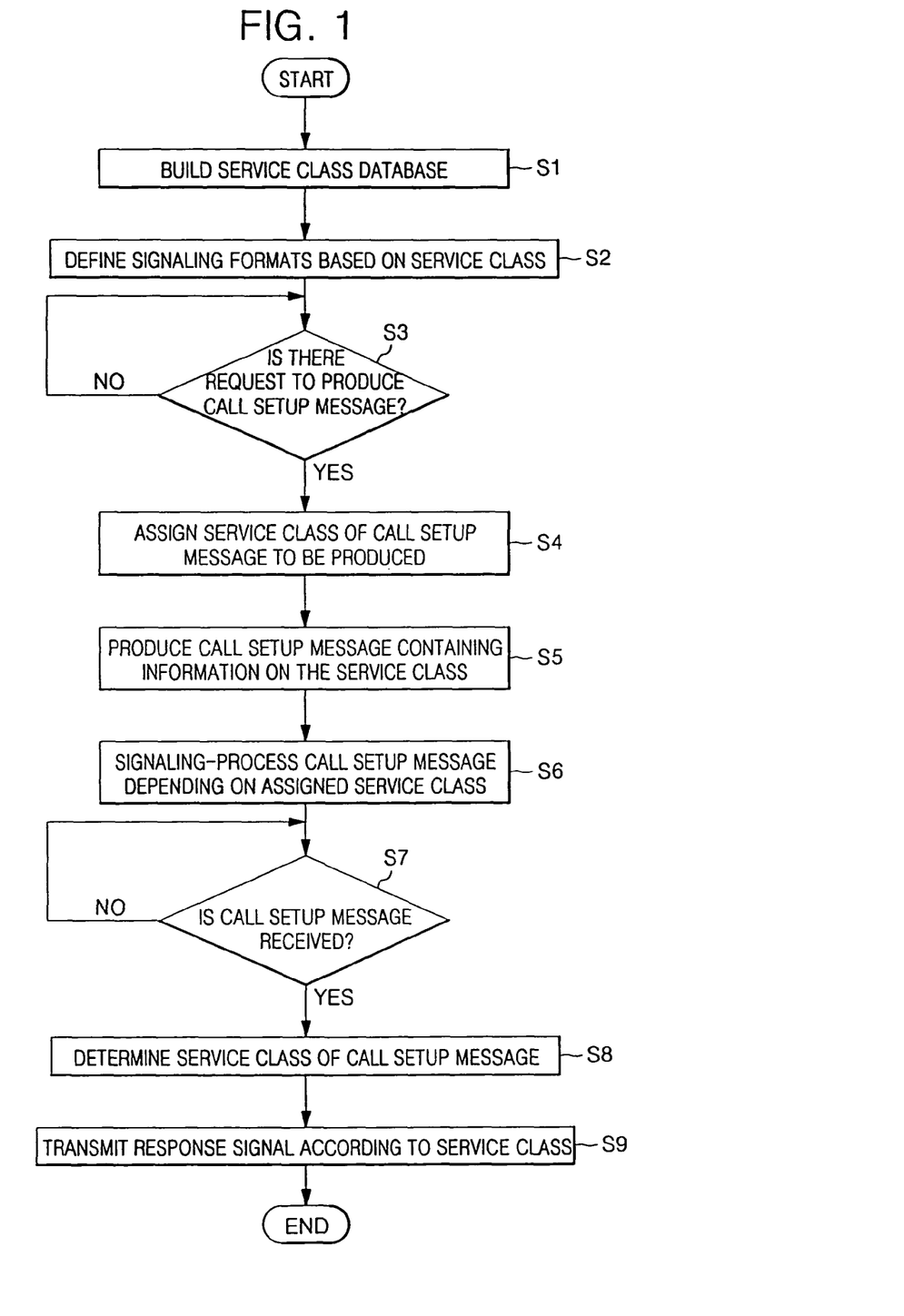
FIG. 1 is an overall flowchart illustrating signaling based on a class of VoIP service according to an embodiment of the present invention.

FIG. 1 is an overall flowchart illustrating signaling based on a class of VoIP service according to an embodiment of the present invention.

Referring to FIG. 1, in VoIP CoS signaling according to an embodiment of the present invention, a database for VoIP signaling based on each class of VoIP service is first built (S1).

The service classes in the database may be classified by several set criteria. For example, the service classes may be classified according to their users or depending on VoIP operation policies.

In an example in which the service classes are classified according to their users, the service classes may be classified by a caller identification (ID) and a called ID.

In an example in which the service classes are classified according to VoIP operation policies, the service classes may be classified by departments and positions in an enterprise. Furthermore, in the case of an ISP, the service classes may be classified by international/national telephone and charge.

The caller ID based service class classification may be made depending on caller identifications, for example, caller telephone numbers.

The called ID based service class classification may be made depending on called identifications, for example, called telephone numbers.

The department based service class classification may be made depending on important departments and unimportant departments in view of the nature of tasks in the enterprise.

The position based service class classification may be made depending on the order of positions in the enterprise, for example, an order of a director, a general manager, a deputy general manager, a section manager, a deputy section manager, and staff.

The international/national telephony based service class classification may be made depending on whether a called identification, for example, a called telephone number, indicates an international telephone or a national telephone.

The charge based service class classification, when a different charge system is applied based on caller identification (caller ID), may be made depending on the charge system. This service class classification maybe useful for ISPs which should charge.

After the database for the VoIP signaling based on the VoIP service class is built, signaling formats are defined which are differentiated by the service class defined in the database (S2).

Defining the differentiated signaling formats refers to defining a content of the signaling based on each service class so that signaling is performed using a differentiated QoS factor which is imparted to each of the service classes classified in the database.

A type of codec, silence suppression or non-silence suppression, a count of multiframes, and the like may be defined in the content of the signaling, which is defined for each service class. That is, the type of codec used may be applied differently depending on the service class. Furthermore, the silence suppression is determined to be applied or not applied depending on the service class. In addition, the count of the multiframes may be determined to be (for example) 1 or 3 depending on the service class, and priority may be defined for a number of available codecs.

At this point, the content of the signaling as defined based on each service class may be defined by considering capability of the codec, the type of data to be handled (e.g., voice or data), system situations, and the like.

After the database is built for any VoIP terminal (or VoIP server) and the signaling formats differentiated by the service class are defined, the VoIP terminal (or VoIP server) determines whether there is a request to produce any call setup message (S3). If there is a request to produce the call setup message, the VoIP terminal (or VoIP server) retrieves the database built on the VoIP terminal (or VoIP server), and determines to which of the service classes classified by a relevant user or VoIP operation policy the requested call setup message belongs, so as to thereby assign the service class (S4).

After assigning the service class to which the requested call setup message belongs, the VoIP terminal (or VoIP server) produces a call setup message containing information as to the service class (S5).

The VoIP terminal (or VoIP server) signaling-processes the produced call setup message by applying the codec, the silence suppression or non-silence suppression, and the count of the multiframes which are defined in a signaling content corresponding to the service class to which the call setup message belongs, and transmits the processed call setup message to the correspondent (S6).

Meanwhile, after the database is built on the VoIP terminal (or VoIP server) and the signaling formats differentiated by the service class are defined, the VoIP terminal (or VoIP server) determines whether the call setup message is received from a correspondent-side system (S7) and, if the call setup message is received, the VoIP terminal (or VoIP server) retrieves the database built on the VoIP terminal (or VoIP server), and determines one of the service classes classified by the user or the VoIP operation policy to which the call setup message belongs (S8).

After determining the service class to which the received call setup message belongs, the VoIP terminal (or VoIP server) applies the codec and the silence suppression or non-silence suppression defined by the signaling content corresponding to the service class to which the relevant call setup message belongs when producing a response signal to the received call setup message, and transmits the response signal to the correspondent (S9).

Figure 2:
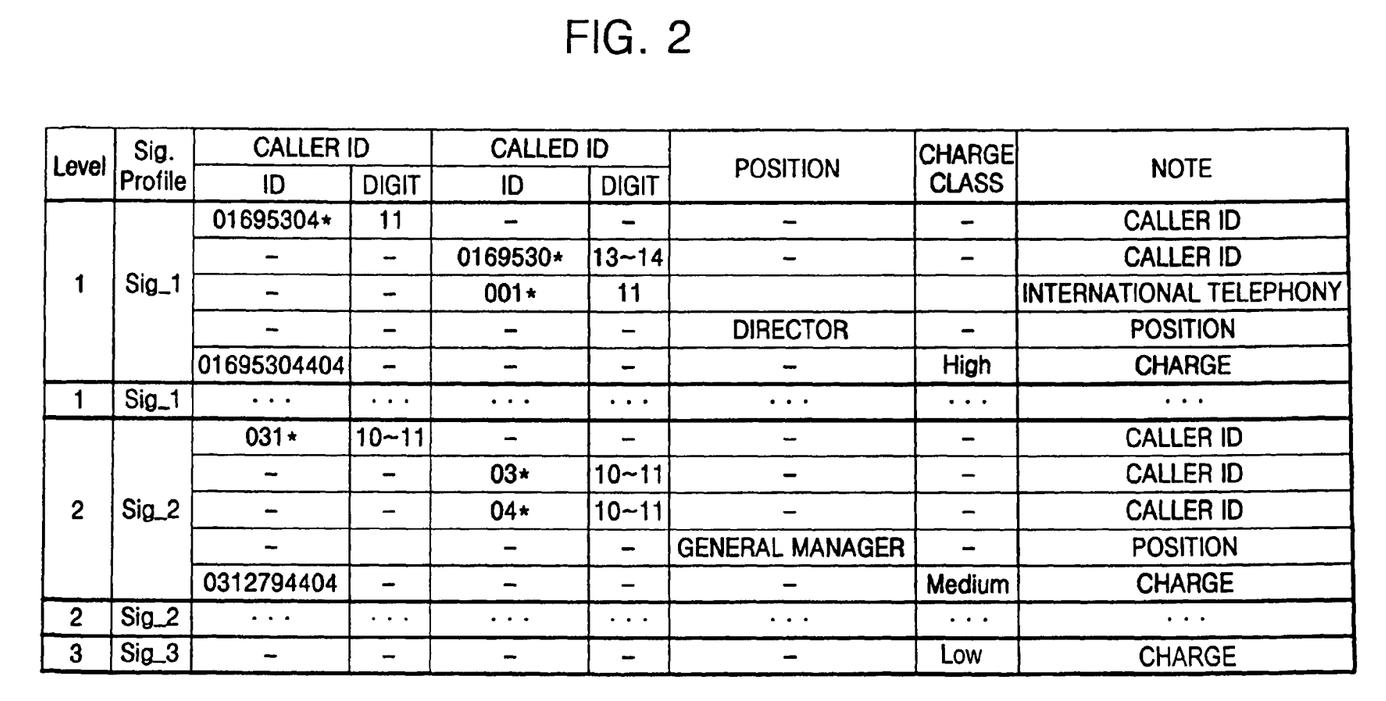
FIG. 2 is a diagram of an example of a database for VoIP CoS signaling according to an embodiment of the present invention.

FIG. 2 is a diagram of an example of a database for VoIP CoS signaling according to an embodiment of the present invention. Such a database is stored in the VoIP terminal or the VoIP server, as described with reference to FIG. 1.

Referring to FIG. 2, the database for the VoIP CoS signaling according to an embodiment of the present invention includes service classes which are classified as level 1, level 2, and level 3. Each service class is defined by several items.

Each service class is classified by caller ID, called ID, department, position, international/national telephone, and charge.

First, the service class of level 1 will be discussed. When the service class is defined based on the caller ID, a caller ID which is 01695304* and has 11 digits is defined as level 1.

Furthermore, when the service class is defined based on the called ID, a called ID which is 0169530* and has 13 to 14 digits is defined as level 1.

When the service class is defined based on the international/national telephone, a called ID which is 001* and has 11 digits is defined as level 1.

When the service class is defined based on position in the enterprise, a director of the enterprise is defined as level 1 irrespective of the caller identification or the called identification.

When the service class is defined based on the charge, the caller identification which is 01695304404 and has a charge class of High is defined as level 1.

Next, the service class of level 2 will be discussed. When the service class is defined based on the caller identification, a caller identification which is 031* and has 10 to 11 digits is defined as level 2.

When the service class is defined by the called identification, a called identification which is 03* and has 10 to 11 digits is defined as level 2. Furthermore, a called identification which is 04* and has 10 to 11 digits is also defined as level 2.

When the service class is defined by position, a general manager is defined as level 2 irrespective of a caller ID or a called ID.

When the service class is defined by the charge, a caller ID which is 0312794404 and has a charge class of Medium is defined as level 2.

Finally, the service class of level 3 will be discussed. When the service class is defined by the charge, the charge system of Low is defined as level 3.

Accordingly, when a VoIP terminal or VoIP server having a database organized in this manner is requested to produce the call setup message, or receives the call setup message, the VoIP terminal or VoIP server performs signaling corresponding to the service class by referring to the database.

For example, when any VoIP terminal (or VoIP server) is requested to produce any call setup message and the caller ID is 01695304* and has 11 digits, the VoIP terminal (or VoIP server) retrieves the database built thereon, determines that the call setup message to be produced belongs to level 1, produces the call setup message containing information as to level 1, performs the signaling by applying the codec, the silence suppression or non-silence suppression, and the count of multiframes which are defined in the signaling content corresponding to level 1, and transmits the resultant call setup message to a correspondent.

Figure 3:
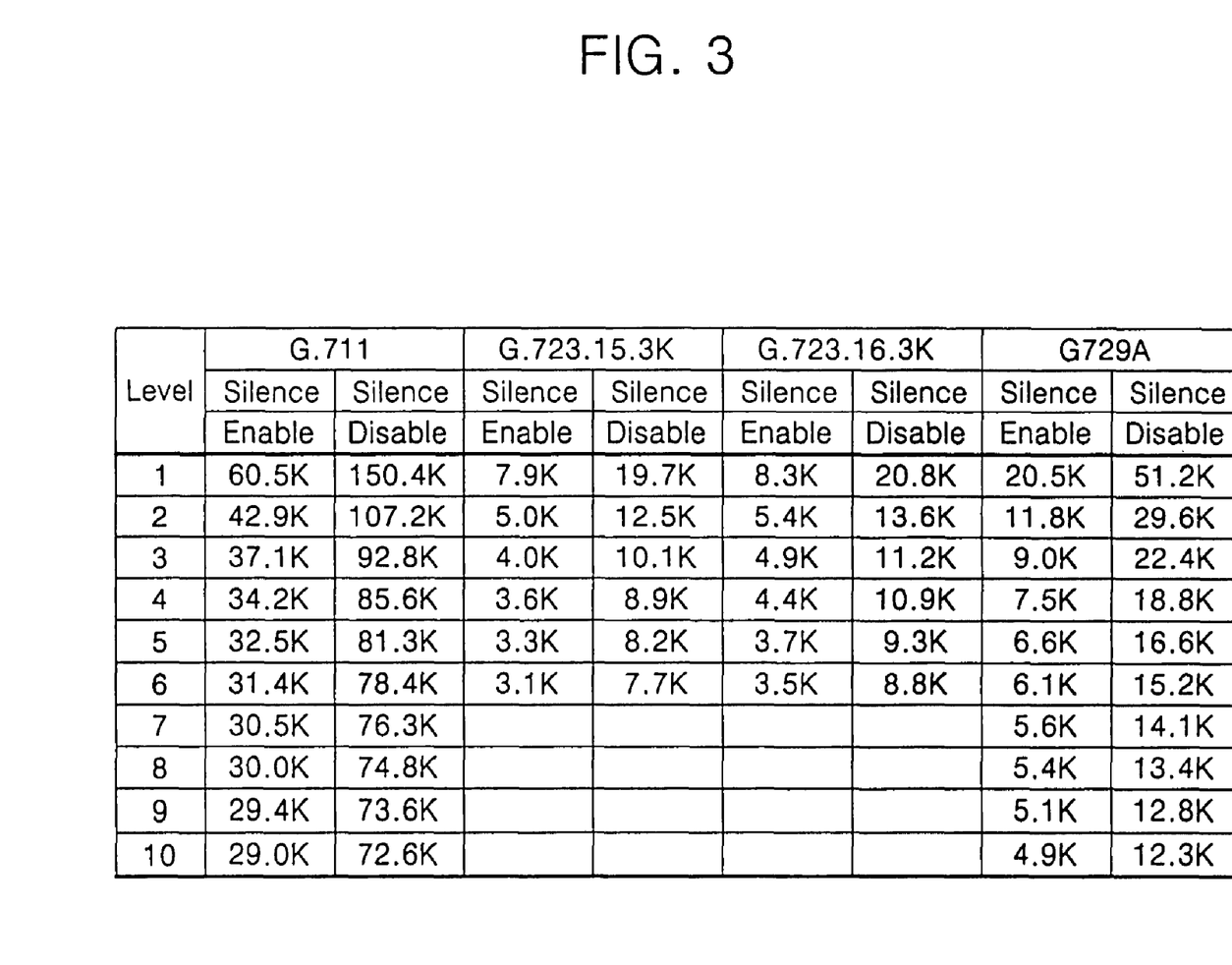
FIG. 3 is a table showing codecs, multiframes, and bandwidths with silence suppression.

FIG. 3 is a table showing codecs, multiframes, and bandwidths with silence suppression. The bandwidth of each VoIP codec is defined in FIG. 3.

A header of a VoIP voice packet includes a total of 54 bytes, and is composed of an RTP header (12 bytes), a UDP header (8 bytes), an IP header (20 bytes), and an Ethernet header (14 bytes).

The bandwidth of each VoIP codec is as follows:

G.723.1 5.3K: 20 bytes/30 ms (actual bandwidth: 19.7K: 20+54*33.3*8)

G.723.1 6.3K: 20 bytes/30 ms (actual bandwidth: 20.8K: 24+54*33.3*8)

G.729A 8K: 10 bytes/10 ms (actual bandwidth: 51.2K: 10+54*100*8)

G.711A/U 64K: 40 bytes/5 ms (actual bandwidth: 150.4K: 40+54*200*8)

Examples of methods for reducing the bandwidth include a method which performs silence suppression, and a method which sends the message in the form of multiframes.

Since conversation contains 50% or more silence (normally, 60%), the use of silence suppression allows the bandwidth to be reduced by 50% or more. The transmission with multiframes allows the overhead of various headers to be reduced.

The silence suppression packet is transmitted once at the beginning of the silence packet, and includes the following bytes for each codec:

G.723.1: 4 bytes
G.729A: 2 bytes
G.711A/U: 1 byte

Furthermore, upon transmission of G.723.1 5.3K, an RTP payload of 20 bytes, an RTP header of 12 bytes, a UDP header of 8 bytes, an IP header of 20 bytes, and an Ethernet packet of 14 bytes, namely, a total of 74 bytes of 19.7 k are transmitted per 30 ms.

Meanwhile, upon transmission of G.723.1 6.3K, 78 bytes (20.8 k) are transmitted per 30 ms, and upon transmission of G.729A, 64 bytes (51.2 k) are transmitted per 10 ms.

For G.711, 94 bytes (150.4 k) are transmitted per 5 ms. Thus the bandwidth depends on the codec used for each call. Since silence suppression is performed at each codec, 50 to 60% of the conversation is normally treated as silence.

Accordingly, as the calculated bandwidth of the codec used for each call, G.723.1 5.3K has 10 K, G.723.1 6.3K has 11K, G.729 has 26K, and G.711 has 75K. In the case where the RTP payload is transmitted in the form of multiframes, the calculated bandwidth is used to calculate the bandwidth of each call.

For example, in the case where the G.723.1 5.3K is transmitted in the form of three multiframes, 114 bytes of the RTP payload of 60 bytes (20 bytes *3), the RTP header of 12 bytes, the UDP header of 8 bytes, the IP header of 20 bytes, and the Ethernet packets of 14 bytes are transmitted for 90 ms (30 ms*3). Thus, the transmission of the G.723.1 5.3K needs a bandwidth of about 10 K, which is expected to be reduced to about 5 K by the use of silence suppression.

Figure 4A:
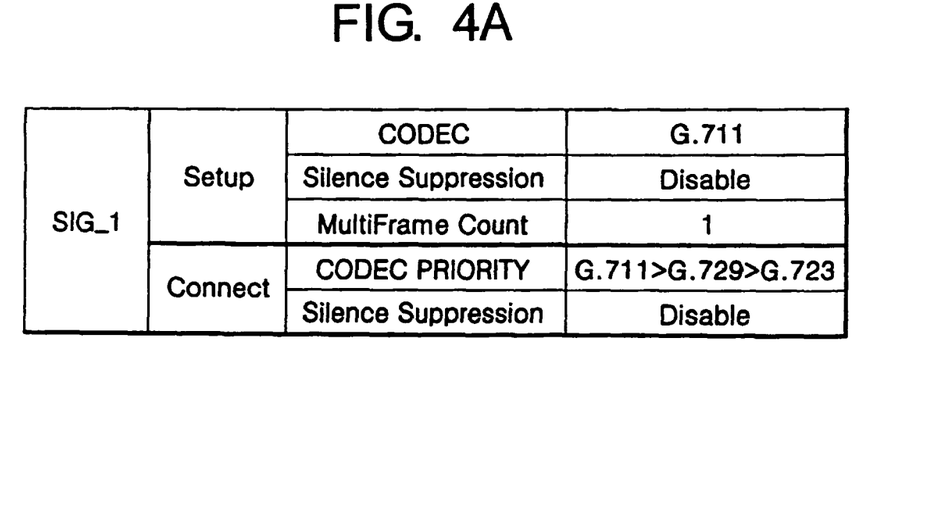
FIG. 4A-4C illustrate a signaling content which is differentiated by a class of service for VoIP CoS signaling according to an embodiment of the present invention.
Figure 4B:
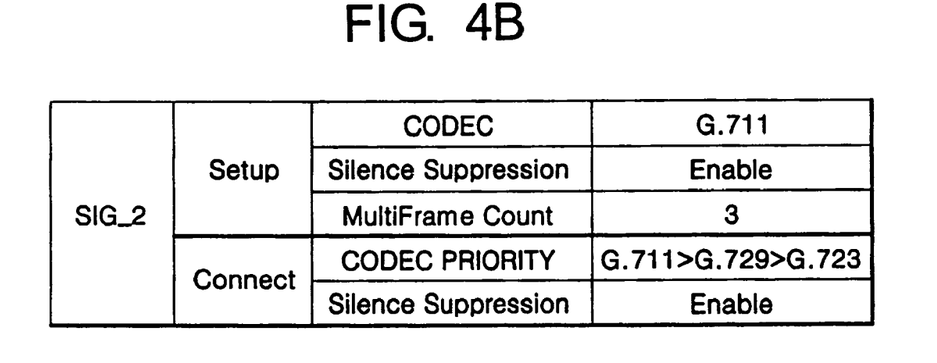
Figure 4C:
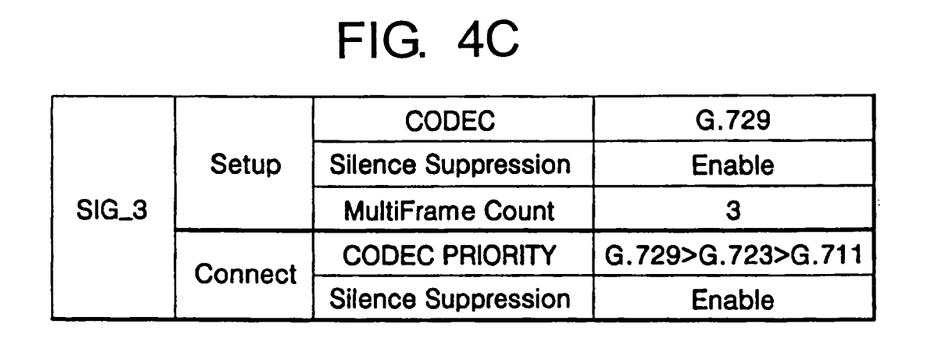

FIGS. 4A-4C illustrate a signaling content which is differentiated by a class of service for VoIP CoS signaling according to an embodiment of the present invention.

In FIGS. 4A-4C, the signaling content which is differentiated by a service class is defined.

The service class based signaling may be classified and defined into signaling a caller party and signaling a called party. It will be herein discussed in conjunction with an H.323 protocol.

For VoIP CoS signaling, a "Setup" message (INVITE for the SIP) may be considered at the caller party, and a "connect" message ("200 OK" for the SIP) may be considered at the called party.

In the "Setup" message, a call setup message containing VoIP media capability (e.g., Sig_x) should be discriminated and defined depending on VoIP CoS DB, as shown in FIG. 1.

When a remotely received VoIP "Setup" message contains media information, a system at the called party performs VoIP CoS processing by analyzing the information and referring to a response codec policy of the system at the called party.

Referring to FIG. 4, when the service class is level 1, for the setup message, the codec used is G.711, the silence suppression is Disable, and the multiframe count is set to 1. For the connect message, the priority of the codec is set to an order of G.711>G.729>G.723, and the silence suppression is set to Disable.

When the service class is level 2, for the setup message, the codec used is G.711, the silence suppression is set to Enable, and the multiframe count is set to 3. For the connect message, the priority of the codec is set to an order of G.711>G.729>G.723, and the silence suppression is set to Enable.

When the service class is level 3, for the setup message, the codec used is G.729, the silence suppression is set to Enable, and the multiframe count is set to 3. For the connect message, the priority of the codec is set to an order of G.729>G.723>G.711, and the silence suppression is set to Enable.

Accordingly, upon processing the setup message and the connect message for the call setup, the signaling which is defined by the service class is referred to, and the call setup signaling fit to relevant conditions will progress, as described above.

That is, VoIP bandwidth and voice quality are predicted based on the codec type, the silence suppression and the multiframe count so as to build the relevant VoIP signaling setup, and a VoIP setup signaling procedure corresponding to the relevant service class is performed for each VoIP call.

When there is media capability information in a remotely received call setup message, a called party of the VoIP call determines the codec response priority in order to respond. Furthermore, the called party responds depending on whether the silence suppression is applied (G.723.1), or sets in a VoIP codec of a local system whether to apply the silence suppression (G.723 and G.729).

Such definition of service class based signaling is applicable to both the VoIP terminal (e.g., a phone or a gateway) and the VoIP server (e.g., an H323 gatekeeper, an SIP server, or a signaling gateway).

For example, since the terminal is able to provide VoIP service without a VoIP server (e.g., an H323 gatekeeper or an SIP server), the terminal can build the DB as shown in FIG. 1 so as to support VoIP CoS signaling and the service.

As described above, the present invention is applicable to a VoIP server (e.g., an H323 Gatekeeper or an SIP Server). The VoIP server is capable of handling the VoIP CoS signaling and the media service based on a relevant service class while operating a VoIP CoS database.

Furthermore, the present invention is also applicable to a VoIP terminal (e.g., a phone or a gateway) so as to define and use the VoIP CoS policy of the VoIP terminal itself.

As described above, when the VoIP terminals or the VoIP servers in the VoIP service system produce and send or receive messages for call setup therebetween, it is possible to provide differentiated VoIP service based on the service class from the time of performing the call setup by discriminating and setting various QoS factors based on the service class according to a user's or VoIP operator's policy.

Although exemplary embodiments of the present invention have been illustrated, it will be apparent that various changes may be made to the present invention without departing from the spirit and scope of the present invention. Therefore, the present invention should not be limited to the illustrated embodiments, but should be determined by the claims and equivalents thereof.

What is claimed is:

1. A method for signaling a voice over Internet protocol (VoIP) call based on a class of VoIP service in a VoIP service system, the method comprising:
   storing VoIP signaling information in a database, the VoIP signaling information comprising a Quality of Service (QoS) factor being differentiated by a class of VoIP service;
   producing a call setup message by referring to the database using a service class assignment condition, the call setup message comprising the QoS factor associated with the class of VoIP service; and
   processing and transmitting, to a correspondent, the produced call setup message with VoIP signaling information comprising the QoS factor corresponding to the class of VoIP service,
   wherein the QoS factor is set differently for the call setup message and for a response message received from the correspondent in response to the call setup message, and
   wherein producing the call setup message comprises:
      determining the class of VoIP service corresponding to the call setup message to be produced;
      assigning a service class to the determined class of VoIP service, the service class being classified by one of a user policy and a VoIP operation policy; and
      producing the call setup message comprising the QoS factor associated with the assigned class of VoIP service.

2. The method of claim 1, wherein the database comprises information associated with at least one service class assignment condition item, the information depending on at least one service class and one of user information and a VoIP operation policy.

3. The method of claim 2, wherein the information associated with said at least one service class assignment condition item comprises at least one of caller ID, called ID, department, position, international/national telephony, and charge system.

4. The method of claim 1, wherein the QoS factor comprises at least one of a type of codec for each service class, silence suppression, non-silence suppression, and a count of multiframes.

5. The method of claim 1, wherein the QoS factor set for the call setup message comprises a type of codec for each service class, one of silence suppression and non-silence suppression, and a count of multiframes.

6. The method of claim 1, wherein the QoS factor set for the response message comprises a priority of codec for each service class, and one of silence suppression and non-silence suppression.

7. The method of claim 1, wherein processing and transmitting the produced call setup message with the VoIP signaling information comprising the QoS factor corresponding to the class of VoIP service comprises processing the produced call setup message to apply a codec, one of silence suppression and non-silence suppression, and a count of multiframes defined in a signaling content corresponding to the class of VoIP service to which the call setup message belongs, and
   transmitting the call setup message comprises transmitting the processed call setup message to a correspondent.

8. The method of claim 1, wherein the database is built in a VoIP terminal.

9. The method of claim 1, wherein the database is built in a VoIP server.

10. A method for signaling a voice over Internet protocol (VoIP) call based on a class of a VoIP service in a VoIP service system, the method comprising:
   storing VoIP signaling information comprising a Quality of Service (QoS) factor in a database, the VoIP signaling information comprising the QoS factor being differentiated by a class of VoIP service;
   performing signaling by extracting information associated with the class of VoIP service from a call setup message in response to receiving the call setup message from a correspondent, and by producing a response message comprising the QoS factor in a signaling format corresponding to the extracted information, the signaling format being set in the database,
   wherein the QoS factor is set differently for the call setup message and for a response message received from the correspondent in response to the call setup message,
   wherein performing signaling comprises:
      determining a service class corresponding to the received call setup message; and producing a response signal through application of a codec and one of silence suppression and non-silence suppression defined in a signaling content corresponding to the class of VoIP service to which the call setup message belongs, and transmitting the produced response signal to the correspondent.

11. An apparatus for signaling a voice over Internet protocol (VoIP) call based on a class of service in a VoIP service system, the apparatus comprising:
a memory comprising a program; and
a processor, connected to the memory, to execute the program;
wherein the processor comprises a VoIP server to build, using the program, a database comprising VoIP signaling information having a Quality of Service (QoS) factor differentiated by a class of VoIP service in a VoIP service system, to produce a call setup message by referring to the database using a service class assignment condition, and to transmit, to a correspondent, the call setup message comprising the QoS factor associated with the class of VoIP service in the VoIP service system,
wherein the processor is configured to determine a class of VoIP service corresponding to the call setup message comprising the QoS factor to be produced, to assign a service class to the determined class of VoIP service, the service class being classified by one of a user policy and a VoIP operation policy, and to produce the call setup message comprising the QoS factor associated with the assigned class of VoIP service, and
wherein the QoS factor is set differently for the call setup message and for a response message received from the correspondent in response to the call setup message.

12. The apparatus of claim 11, wherein the processor processes and transmits, by means of the program, the produced call setup message with the VoIP signaling information comprising the QoS factor associated with the class of service in the VoIP service system.

13. An apparatus for signaling a voice over Internet protocol (VoIP) call based on a class of service in a VoIP service system, the apparatus comprising:
a memory comprising a program; and
a processor, connected to the memory, to execute the program;
wherein the processor comprises a VoIP server to perform signaling by building, using the program, a database comprising VoIP signaling information having a Quality of Service (QoS) factor differentiated by a class of VoIP service in a VoIP service system, and by extracting information associated with the class of service in the VoIP service system from a call setup message in response to the call setup message being received from a correspondent, to produce a response message in a signaling format corresponding to the extracted information associated with the class of VoIP service in the VoIP service system, the signaling format being set in the database,
wherein the QoS factor is set differently for the call setup message and for the response message, and
wherein the processor is configured to determine a service class corresponding to the received call setup message, and to produce a response signal through application of a codec and one of silence suppression and non-silence suppression defined in a signaling content corresponding to the class of VoIP service to which the call setup message belongs, and to transmit the produced response signal to the correspondent.

* * * * *